United States Patent
Lee et al.

(10) Patent No.: US 11,140,377 B2
(45) Date of Patent: Oct. 5, 2021

(54) METHOD FOR PROCESSING IMMERSIVE VIDEO AND METHOD FOR PRODUCING IMMERSIVE VIDEO

(71) Applicant: Electronics and Telecommunications Research Institute, Daejeon (KR)

(72) Inventors: Gwang Soon Lee, Daejeon (KR); Hong Chang Shin, Daejeon (KR); Ho Min Eum, Daejeon (KR); Jun Young Jeong, Seoul (KR)

(73) Assignee: Electronics and Telecommunications Research institute, Daejeon (KR)

( * ) Notice: Subject to any disclaimer, the term of this patent is extended or adjusted under 35 U.S.C. 154(b) by 0 days.

(21) Appl. No.: 17/029,507

(22) Filed: Sep. 23, 2020

(65) Prior Publication Data

US 2021/0092346 A1    Mar. 25, 2021

(30) Foreign Application Priority Data

Sep. 23, 2019  (KR) ................. 10-2019-0116827
Jan. 17, 2020  (KR) ................. 10-2020-0006351
Sep. 22, 2020  (KR) ................. 10-2020-0122004

(51) Int. Cl.
*H04N 13/161*  (2018.01)
*H04N 13/178*  (2018.01)
*H04N 13/282*  (2018.01)
*H04N 13/00*   (2018.01)

(52) U.S. Cl.
CPC ......... *H04N 13/161* (2018.05); *H04N 13/178* (2018.05); *H04N 13/282* (2018.05); *H04N 2013/0081* (2013.01); *H04N 2013/0088* (2013.01)

(58) Field of Classification Search
None
See application file for complete search history.

(56) References Cited

U.S. PATENT DOCUMENTS

| | | | |
|---|---|---|---|
| 2012/0122062 A1 | 5/2012 | Yang et al. | |
| 2015/0317057 A1 | 11/2015 | Choi et al. | |
| 2021/0006833 A1* | 1/2021 | Tourapis | ................ H04N 19/20 |
| 2021/0006834 A1* | 1/2021 | Salahieh | ............. H04N 13/178 |

FOREIGN PATENT DOCUMENTS

| | | |
|---|---|---|
| KR | 100902353 B1 | 6/2009 |
| KR | 1020130128690 A | 11/2013 |

OTHER PUBLICATIONS

Jill Boyce et al., Working Draft 1 of Metadata for Immersive Media (Video), Coding of moving pictures and audio, Mar. 2019, pp. 1-28, ISO/IEC JTC1/SC29/WG11 MPEG2018/M18464 N18464, International Organisation for Standardisation, Geneva, CH.

* cited by examiner

*Primary Examiner* — Christopher Braniff
(74) *Attorney, Agent, or Firm* — William Park & Associates Ltd.

(57) ABSTRACT

Disclosed herein is an immersive video processing method. The immersive video processing method includes: determining a priority order of pruning for source videos; extracting patches from the source videos based on the priority order of pruning; generating at least one atlas based on the extracted patches; and encoding metadata. Herein, the metadata may include first threshold information that becomes a criterion for distinguishing between a valid pixel and an invalid pixel in the atlas video.

9 Claims, 8 Drawing Sheets

METHOD FOR PROCESSING IMMERSIVE VIDEO AND METHOD FOR PRODUCING IMMERSIVE VIDEO

CROSS REFERENCE TO RELATED APPLICATION

The present application claims priority to Korean Patent Application No. 10-2019-0116827, filed Sep. 23, 2019, No. 10-2020-0006351, filed Jan. 17, 2020 and No. 10-2020-0122004, filed Sep. 22, 2020 the entire contents of which are incorporated herein for all purposes by this reference.

BACKGROUND OF THE INVENTION

Field of the Invention

The present disclosure relates to a processing/outputting method for an immersive video supporting motion parallax for rotational and translation motions.

Description of the Related Art

Virtual reality service evolves towards maximizing senses of immersion and realism by generating an omni-directional video in realistic or CG (Computer Graphics) format and reproducing the video on an HMD (Head Mounted Display), a smart phone and the like. It is currently known that 6 DoF (Degrees of Freedom) needs to be supported in order to play a natural and highly immersive omni-directional video through an HMD. A 6 DoF video provided on an HMD should be a free video in six directions including (1) the horizontal movement, (2) the vertical rotation, (3) the vertical movement and (4) the horizontal rotation. However, most omni-directional videos based on real images are currently supporting only rotational movements. Therefore, researches on such technical fields as the acquisition and reproduction of 6 DoF omni-directional videos are actively under way.

SUMMARY OF THE INVENTION

The present disclosure is directed to provide a method of distinguishing between a valid pixel and an invalid pixel in an atlas video.

Also, the present disclosure is directed to provide a method of distinguishing between a valid pixel and an invalid pixel by embedding occupancy information into a depth atlas.

Also, the present disclosure is directed to provide a method of distinguishing between a valid pixel and an invalid pixel by generating an occupancy map, even when occupancy information is embedded into a depth atlas.

The technical objects of the present disclosure are not limited to the above-mentioned technical objects, and other technical objects that are not mentioned will be clearly understood by those skilled in the art through the following descriptions.

An immersive video synthesizing method according to the present disclosure may include: parsing video data and metadata from a bitstream; obtaining at least one atlas by decoding the video data; and extracting patches required for viewport video synthesis according to a user movement from the atlas based on metadata. Herein, the metadata may include first threshold information that becomes a criterion for distinguishing between a valid pixel and an invalid pixel in the atlas video.

In an immersive video synthesizing method according to the present disclosure, the metadata may include a first flag indicating whether or not a threshold is set for each patch in the atlas video. When the first flag indicates that a threshold is set for each patch, the metadata may include second threshold information for a patch in the atlas video.

In an immersive video synthesizing method according to the present disclosure, when the first flag indicates that a threshold is not set for each patch, the threshold may be derived by the first threshold information. When the first flag indicates that a threshold is set for each patch, the threshold may be derived by the second threshold information.

In an immersive video synthesizing method according to the present disclosure, the metadata may further include minimum value information indicating a minimum depth value and maximum value information indicating a maximum depth value.

In an immersive video synthesizing method according to the present disclosure, the metadata may further include a second flag indicating whether or not occupancy information is embedded into the atlas video. When the second flag indicates that occupancy information is embedded into the atlas video, the first threshold information may be parsed.

In an immersive video synthesizing method according to the present disclosure, when the second flag indicates that occupancy information is not embedded into the atlas video, a valid pixel and an invalid pixel may be distinguished in the atlas video based on an occupancy map.

In an immersive video synthesizing method according to the present disclosure, the metadata may further include a third flag indicating whether or not the occupancy map has a different size from the atlas video.

In an immersive video synthesizing method according to the present disclosure, a pixel having a smaller value than a threshold, which is derived by the first threshold information, in the atlas video may be determined as an invalid pixel, and a pixel having an equal or greater value than the threshold may be determined as a valid pixel.

An immersive video processing method according to the present disclosure may include: determining a priority order of pruning for source videos; based on the priority order of pruning, extracting patches from the source videos; based on the extracted patches, generating at least one atlas; and encoding metadata. Herein, the metadata may include first threshold information that becomes a criterion for distinguishing between a valid pixel and an invalid pixel in the atlas video.

In an immersive video processing method according to the present disclosure, the metadata may include a first flag indicating whether or not a threshold is set for each patch in the atlas video. When a threshold is set for each patch, second threshold information for a patch in the atlas video may be additionally encoded.

In an immersive video processing method according to the present disclosure, the metadata may further include minimum value information indicating a minimum depth value and maximum value information indicating a maximum depth value.

In an immersive video processing method according to the present disclosure, the first threshold information may be encoded only when occupancy information is not embedded into the atlas video.

The features briefly summarized above with respect to the present disclosure are merely exemplary aspects of the detailed description below of the present disclosure, and do not limit the scope of the present disclosure.

According to the present disclosure, a method of distinguishing between a valid pixel and an invalid pixel in an atlas video may be provided.

According to the present disclosure, a method of distinguishing between a valid pixel and an invalid pixel based on at least one of an occupancy map and a depth atlas may be provided.

According to the present disclosure, when occupancy information is embedded into a depth atlas, the efficiency in processing an immersive video may be improved by generating an occupancy map.

Effects obtained in the present disclosure are not limited to the above-mentioned effects, and other effects not mentioned above may be clearly understood by those skilled in the art from the following description.

DETAILED DESCRIPTION OF THE INVENTION

Figure 1:
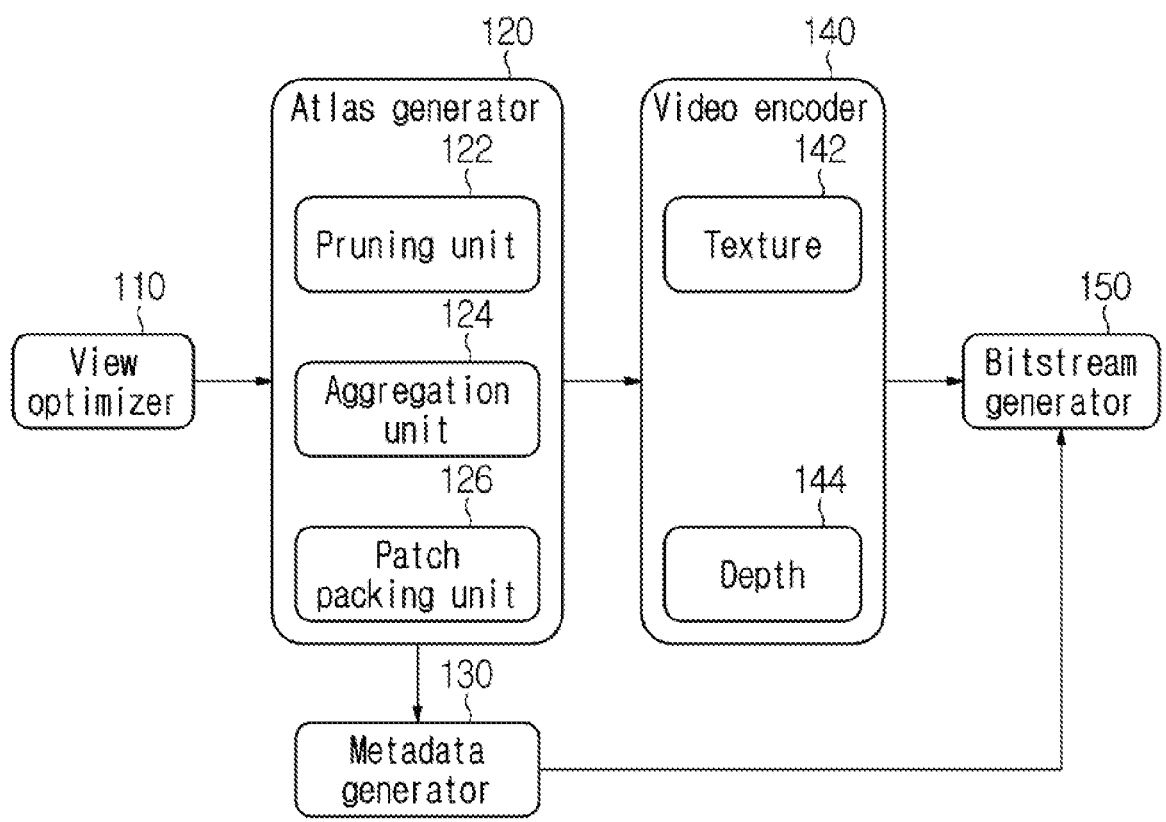
FIG. 1 is a block diagram of an immersive video processing apparatus according to an embodiment of the present disclosure.

A variety of modifications may be made to the present disclosure and there are various embodiments of the present disclosure, examples of which will now be provided with reference to drawings and described in detail. However, the present disclosure is not limited thereto, although the exemplary embodiments may be construed as including all modifications, equivalents, or substitutes in a technical concept and a technical scope of the present disclosure. In the drawings, similar reference numerals refer to same or similar functions in various aspects. In the drawings, the shapes and dimensions of elements may be exaggerated for clarity. In the following detailed description of the present disclosure, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific shapes, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the embodiment. The following detailed description is, therefore, not to be taken in a limiting sense, and the scope of the exemplary embodiments is defined only by the appended claims, appropriately interpreted, along with the full range of equivalents to what the claims claim.

Terms used in the present disclosure, 'first', 'second', and the like may be used to describe various components, but the components are not to be construed as being limited to the terms. The terms are used only to differentiate one component from other components. For example, the 'first' component may be named the 'second' component without departing from the scope of the present disclosure, and the 'second' component may also be similarly named the 'first' component. The term 'and/or' includes a combination of a plurality of relevant items or any one of a plurality of relevant terms.

When an element is simply referred to as being 'connected to' or 'coupled to' another element in the present description, it should be understood that the former element is directly connected to or directly coupled to the latter element or the former element is connected to or coupled to the latter element, having yet another element intervening therebetween. In contrast, when an element is referred to as being "directly coupled" or "directly connected" to another element, it should be understood that there is no intervening element therebetween.

Furthermore, constitutional parts shown in the embodiments of the present disclosure are independently shown so as to represent characteristic functions different from each other. Thus, it does not mean that each constitutional part is constituted in a constitutional unit of separated hardware or software. In other words, each constitutional part includes each of enumerated constitutional parts for better understanding and ease of description. Thus, at least two constitutional parts of each constitutional part may be combined to form one constitutional part or one constitutional part may be divided into a plurality of constitutional parts to perform each function. Both an embodiment where each constitutional part is combined and another embodiment where one constitutional part is divided are also included in the scope of the present disclosure, if not departing from the essence of the present disclosure.

The terms used in the present disclosure are merely used to describe particular embodiments, and are not intended to limit the present disclosure. Singular expressions encompass plural expressions unless the context clearly indicates otherwise. In the present disclosure, it is to be understood that terms such as "include", "have", etc. are intended to indicate the existence of the features, numbers, steps, actions, elements, parts, or combinations thereof disclosed in the specification but are not intended to preclude the possibility of the presence or addition of one or more other features, numbers, steps, actions, elements, parts, or combinations thereof. In other words, when a specific element is referred to as being "included", other elements than the corresponding element are not excluded, but additional elements may be included in the embodiments of the present disclosure or the technical scope of the present disclosure.

In addition, some of components may not be indispensable ones performing essential functions of the present disclosure but may be selective ones only for improving performance. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Hereinafter, embodiments of the present disclosure will be described in detail with reference to the accompanying drawings. In describing exemplary embodiments of the present specification, well-known functions or constructions will not be described in detail since they may unnecessarily obscure the understanding of the present specification. Identical constituent elements in the drawings are denoted by identical reference numerals, and a repeated description of identical elements will be omitted.

An immersive video means a video that enables a viewport to dynamically change when a viewing position of a user changes. A multiplicity of input videos is required to realize an immersive video. Each of the multiplicity of input videos may be referred to as a source video or a source view.

Immersive videos may be classified into such types as 3DoF (Degree of Freedom), 3DoF+, Windowed-6DoF and 6DoF. A 3DoF immersive video may be realized by using only a texture video. On the other hand, not only a texture video but also a depth video is required to render an immersive video including depth information like 3DoF+ or 6DoF.

It is assumed that the embodiments described below are directed to process an immersive video including depth information like 3DoF+ and/or 6DoF. Also, a source video is assumed to consist of a texture video and a depth video.

FIG. 1 is a block diagram of an immersive video processing apparatus according to an embodiment of the present disclosure.

Referring to FIG. 1, an immersive video processing apparatus according to the present disclosure may include a view optimizer 110, an atlas generator 120, a metadata generator 130, a video encoder 140, and a bitstream generator 150.

The view optimizer 110 classifies source videos into basic videos and additional videos. A basic video is a source video with the highest pruning priority, and an additional video is a source video with lower pruning priority than the basic video.

The view optimizer 110 may determine at least one of the source videos as a basic video. A source video that is not selected as a basic video may be classified as an additional video.

The view optimizer 110 may determine a basic video by considering the view position of a source video. For example, among a multiplicity of videos, a source video with the view position at its center may be selected as a basic video.

Alternatively, the view optimizer 110 may determine a basic video based on a camera parameter. Specifically, the view optimizer 110 may determine a basic video based on at least one of a camera index, an order of priority among cameras, a camera position, and whether or not a camera is a ROI camera.

For example, at least one of the following videos may be determined as a basic view video: a source video with a smallest camera index, a source video with a largest camera index, a source index having a same camera index as a predefined value, a source video taken through a camera with highest priority, a source video taken through a camera with lowest priority, a source video taken through a camera at a predefined position (for example, at a center position), and a source video taken through a ROI camera.

Alternatively, the view optimizer 110 may determine a basic video based on the qualities of source videos. For example, a source video with highest quality among source videos may be determined as a basic video.

Alternatively, the view optimizer 110 may examine a degree of data redundancy among source videos and then determine a basic video by considering a proportion of redundant data with other source videos. For example, a source video with a highest or lowest proportion of redundant data with other source videos may be determined as a basic video.

A multiplicity of source videos may be set as basic videos.

The atlas generator 120 generates a pruning mask by performing pruning. In addition, a patch may be extracted by using a pruning mask, and an atlas may be generated by combining a basic video and/or the extracted patch.

An atlas thus generated may consist of a texture atlas and a depth atlas. A texture atlas represents a video combining a basic texture video and/or texture patches, and a depth atlas represents a video combining a basic depth video and/or depth patches.

The atlas generator 120 may include a pruning unit (pruner) 122, an aggregation unit (aggregator) 124 and a patch packing unit (patch packer) 126.

The pruning unit 122 performs pruning for an additional video based on a priority order of pruning. Particularly, the pruning unit 122 may perform pruning for an additional video by using a reference video that has higher pruning priority than the additional video.

A reference video includes a basic video. In addition, according to the pruning priority of an additional video, a reference video may further include another additional video.

It may be selectively determined whether or not an additional video is capable of being used as an additional video. For example, when an additional video is set not to be used as a reference video, only a basic video may be set as a reference video.

On the other hand, when it is set that an additional video is capable of being used as a reference video, an additional video that has higher pruning priority than a basic video and another additional video may be set as a reference video.

Through a pruning process, redundant data between an additional video and a reference video may be removed. Redundant data detected from an additional video may be removed. As a result of pruning, a pruning mask may be generated which indicates a non-overlapping region between an additional video and a reference video. A pruning mask may be binary type data indicating non-redundant data of an additional video with a reference video. For example, on a pruning mask, a pixel detected as redundant data may be marked as 0, and a pixel not detected as redundant data may be marked as 1.

Detection of redundant data may be performed by comparing depth videos. Specifically, depth information is compared between corresponding positions of an additional depth video and a reference depth video respectively. When a difference is equal to or less than a threshold, a corresponding position may detect redundant data between an additional depth video and a reference depth video.

A non-overlapping region may have a non-rectangular shape, while the shape of a patch is limited to rectangle. Accordingly, a patch may include an invalid region as well as a valid region. Herein, a valid region means a region composed of non-redundant pixels between an additional video and a reference video. In other words, a valid region is a region including data that are included in an additional video but not in a reference video. An invalid region means a region that is composed of redundant pixels between an additional video and a reference video. A pixel/data included in a valid region may be referred to as a valid pixel/valid data, and a pixel/data included in an invalid region may be referred to as an invalid pixel/invalid data.

The aggregation unit 124 extracts a patch by using a pruning mask. Specifically, the aggregation unit 124 may extract a rectangular region including valid data in an additional video as a patch. As a patch is extracted in a rectangular shape irrespective of a shape of a valid region, a patch extracted from a non-rectangular valid region may include not only valid data but also invalid data.

The aggregation unit 124 may group at least one or more patches.

As for a source video that is not pruned, the entire source video may be treated as one patch. Specifically, an entire 2D video, which develops an unpruned source video in a predetermined projection format, may be set as a single patch. A projection format may include at least one of an equirectangular projection format (ERP), a cube map, and a perspective projection format.

Herein, an unpruned source video means a basic video with highest pruning priority. Alternatively, an additional video without redundant data with a basic video and a reference video may be defined as an unpruned source video.

The packing unit 126 may pack each of patches that are clustering on a rectangular video. Packing may be accompanied by transformation like scaling, rotation and flip of a patch. A video where patches are packed may be defined as an atlas.

Specifically, the packing unit 126 may generate a texture atlas by packing a basic texture video and/or texture patches and generate a depth atlas by packing a basic depth video and/or depth patches.

As a single patch, an entire basic video may be packed into an atlas video.

The number of atlases generated by the atlas generator 120 may be determined based on at least one of the arrangement of camera rigs, the accuracy of a depth map, and the number of source videos.

The metadata generator 130 generates metadata for view video synthesis. Metadata may include at least one of camera-related data, pruning-related data, atlas-related data and patch-related data.

Pruning-related data include information for determining a priority order of pruning among source videos. For example, at least one of a flag indicating whether or not a source video is a root node and a flag indicating whether or not a source video is a leaf node may be encoded. A root node represents a source video with highest pruning priority (that is, basic video), and a leaf node represents a source video with lowest pruning priority.

When a source video is not a root node, a parent node index may be additionally encoded. A parent node index may represent a video index of a source video that is a parent node.

Alternatively, when a source video is not a leaf node, a child node index may be additionally encoded. A child node index may represent a video index of a source video that is a child node.

Atlas-related data may include at least one of information on the number of atlases, information on a priority order among atlases, a flag indicating whether or not an atlas includes a complete video, and information related to scaling of an atlas.

Patch-related data include a position and/or size of a patch in an atlas video, a source video to which a patch belongs, and information for specifying a position and/or size of a patch in a source video. For example, at least one of positional information indicating a position of a patch in an atlas video and size information indicating a size of a patch in an atlas video may be encoded. In addition, a source index for identifying a source video, from which a patch originates, may be encoded. A source index represents a source video index that is an original source of a patch. In addition, positional information indicating a position corresponding to a patch in a source video or size information indicating a size corresponding to a patch in a source video may be encoded.

The video encoder 140 encodes an atlas. The video encoder 140 may include a texture video encoder 140 for encoding a texture atlas and a depth video encoder 144 for encoding a depth atlas.

The bitstream generator 150 generates a bitstream based on encoded video data and metadata. A bitstream thus generated may be transmitted to an immersive video output apparatus.

Figure 2:
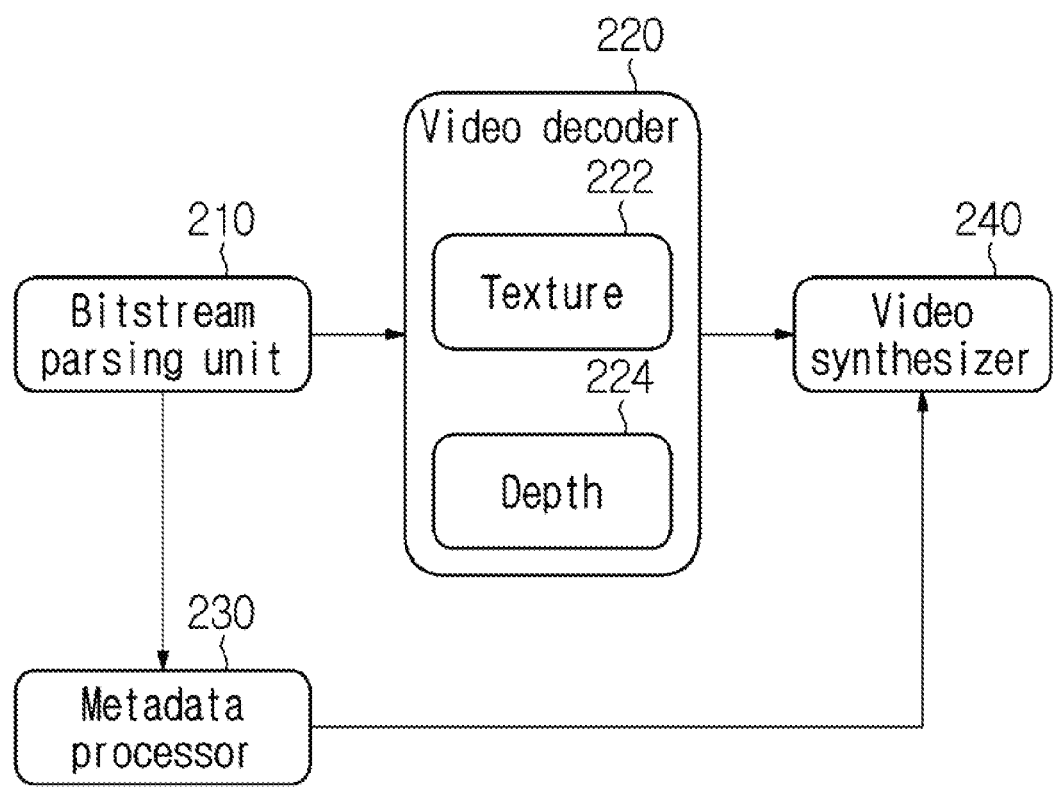
FIG. 2 is a block diagram of an immersive video outputting apparatus according to an embodiment of the present disclosure.

FIG. 2 is a block diagram of an immersive video outputting apparatus according to an embodiment of the present disclosure.

Referring to FIG. 2, an immersive video output apparatus according to the present disclosure may include a bitstream parsing unit (parser) 210, a video decoder 220, a metadata processor 230 and a video synthesizer 240.

The bitstream parsing unit 210 parses video data and metadata from a bitstream. Video data may include data of an encoded atlas.

The video decoder 220 decodes parsed video data. The video decoder 220 may include a texture video decoder 222 for decoding a texture atlas and a depth video decoder 224 for decoding a depth atlas.

The metadata processor 230 unformats parsed metadata.

Unformatted metadata may be used to synthesize a view video. For example, when a user's movement information is input into an immersive video output apparatus, the metadata processor 230 may determine an atlas necessary for video synthesis, patches necessary for video synthesis and/or the positions/sizes of the patches in an atlas in order to reproduce a viewport video according to the user's movement.

The video synthesizer 240 may dynamically synthesize a viewport video according to a user's movement. Specifically, the video synthesizer 240 may extract patches necessary to synthesize a viewport video from an atlas by using information that is determined in the metadata processor 230 according to a user's movement. Specifically, a viewport video may be generated by extracting patches from an atlas including information on a source video necessary for synthesizing the viewport video and the source video within the atlas and by synthesizing the extracted patches.

Figure 3:
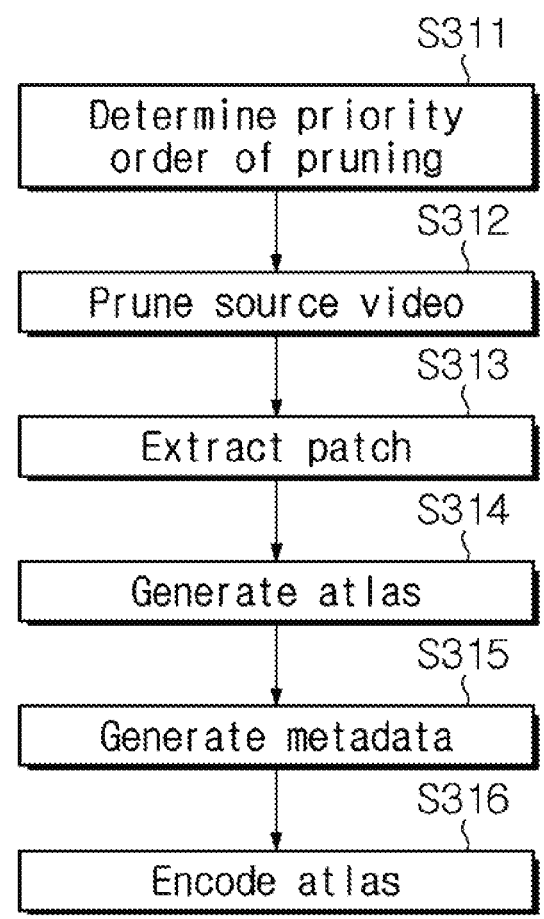
FIG. 3 and FIG. 4 illustrate flow charts of an immersive video processing method and an immersive video outputting method respectively.
Figure 4:
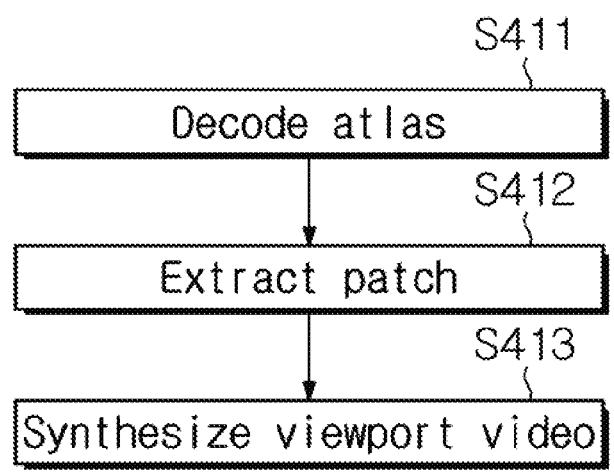

FIG. 3 and FIG. 4 illustrate flow charts of an immersive video processing method and an immersive video outputting method respectively. It is also possible to process or output an immersive video in a different order from the orders described in FIG. 3 and FIG. 4.

An immersive video processing apparatus may determine a priority order of pruning for source videos (S311). Specifically, source videos may be classified into basic videos and additional videos, and a priority order of pruning may be set among additional videos.

Then, based on the priority order of pruning, pruning may be performed for the source videos (S312), and a patch may be extracted by using a pruning mask that is generated as a result of pruning (S313). As for a source video that is not pruned (for example, a basic video), the entire source video may be treated as one patch.

Then, an atlas may be generated by combining extracted patches (S314), and the information on the generated atlas and the information on patches included in the atlas may be generated as metadata (S315).

The atlas may be encoded (S316), and the metadata and the encoded atlas may be transmitted to an immersive video output apparatus.

An immersive video output apparatus may extract atlas data by parsing a bitstream, which is received from an immersive video processing apparatus, and decode an atlas based on extracted data (S411).

In addition, when a user's movement occurs, an atlas required for synthesizing a viewport video according to the user's movement may be determined based on metadata, and patches included in the atlas may be extracted (S412).

When patches are extracted, a viewport video may be generated by synthesizing the extracted patches (S413). Herein, in order to synthesize generated patches, size/position information of each patch and a camera parameter may be used.

Based on the above description, a video processing method proposed by the present disclosure will be described in further detail.

An overlapping region that is detected as a result of pruning is not limited to a rectangular shape, while a patch is limited to a rectangular shape. Accordingly, a patch may include valid data used for image reconstruction but also invalid not used for image reconstruction. Since an invalid region includes pixels that are unnecessary for image reconstruction, an invalid region is an undermining factor for video compression performance.

An atlas video may be generated by combining patches. Herein, when packing patches, invalid regions of patches are allowed to overlap with each other and thus compression efficiency for an atlas video may be enhanced.

In addition, an occupancy map for distinguishing between a valid region and an invalid region in an atlas video may be generated. An occupancy map may be binary type data distinguishing between valid data and invalid data in an atlas video. For example, the value of a pixel corresponding to a valid pixel in an occupancy map may be set to 1. On the other hand, the value of a pixel corresponding to an invalid pixel in an occupancy map may be set to 0.

An occupancy map may have the same size as an atlas video. For example, when an atlas video is scaled, an occupancy map may also be scaled to the same size as the atlas video.

Alternatively, an atlas video and an occupancy map may have different sizes. In this case, scaling-related information of the occupancy map may be encoded as metadata. Scaling-related information may include at least one of information indicating whether or not an occupancy map has a different size from an atlas video and/or information for determining a scaling factor of an occupancy map.

Instead of separately generating an occupancy map, a valid pixel and an invalid pixel may be distinguished by using a depth atlas. Information indicating whether or not occupancy information for distinguishing between a valid pixel and an invalid pixel is embedded into a depth atlas may be encoded as metadata. For example, when the syntax embedded_occupancy_flag is 1, the syntax indicates that occupancy information is embedded into a depth atlas. When occupancy information is embedded into a depth atlas, a procedure of generating an occupancy map may be skipped. On the other hand, when the syntax embedded_occupancy_flag is 0, the syntax indicates that occupancy information is transmitted through an occupancy map.

When occupancy information is embedded into a depth atlas, whether a predetermined pixel is a valid pixel or an invalid pixel may be determined by comparing the value of the predetermined pixel with any threshold. Hereinafter, this will be described in detail.

When a depth atlas is generated, a depth value may be normalized and the normalized depth value may be narrowing converted to a range that is capable of being processed in a depth encoder. Herein, the range capable of being processed in a depth encoder may be determined by bits per pixel. In other words, a depth value in a depth atlas may have a range from 0 to $(2^{bit\_depth})-1$.

For example, when a depth atlas is 16 bits in depth but a depth encoder supports a 10-bit depth map, depth values between 0 and 65,545 ($2^{16}-1$) in the depth atlas may be narrowing converted to the range from 0 to 1,023 ($2^{10}-1$) that is supported by the depth encoder.

In order to distinguish between a valid pixel and an invalid pixel in an atlas video, a value of an invalid pixel in a depth atlas may be set to a predefined value. A predefined value may be 0 or greater. When a predefined value is 0, an immersive video output apparatus may determine a pixel with a value of 0 as an invalid pixel and a pixel with a value of not 0 as a valid pixel in a depth atlas.

Alternatively, a threshold may be set to distinguish between a valid pixel and an invalid pixel. An immersive video output apparatus may determine whether a pixel is an invalid pixel or a valid pixel by comparing a depth value and a threshold. For example, when a depth value is smaller than a threshold, it means that a corresponding pixel is an invalid pixel. When the depth value is equal to or greater than the threshold, it means that the corresponding pixel is a valid pixel.

A threshold may be variably determined based on a bit depth. For example, a threshold may be set to $2^{(bit\_depth-n)}$. Here, n may be a fixed constant or a variable that is determined according to a bit depth. For example, when a depth encoder is capable of supporting a bit depth of 10 bits, a threshold may be set to 64 (that is, $2^{(10-4)}$). In this case, when a pixel value is less than 64, it means that the pixel is an invalid pixel. When a pixel value is equal to or greater than 64, it means that the pixel is a valid pixel.

Alternatively, information indicating a threshold may be signaled through a bitstream. A threshold may be set in a video unit or a patch unit. Information indicating a setting unit of threshold may be encoded as metadata. For example, the syntax depth_occ_threshold_flag may be encoded which indicates whether a threshold is set in a video unit or a patch unit.

When the syntax depth_occ_threshold_flag is 0, a threshold is set in a video unit. In this case, information indicating a threshold may be signaled in each atlas video. On the other hand, when the syntax depth_occ_threshold_flag is 1, a threshold is set in a patch unit. When depth_occ_threshold_flag is 1, information indicating a threshold may be signaled in each patch.

When a threshold is set, if a pixel, although being a valid pixel, has a value less than the threshold, an immersive video processing apparatus may treat the pixel not as a valid pixel but as an invalid pixel. This is a problem.

Figure 5:
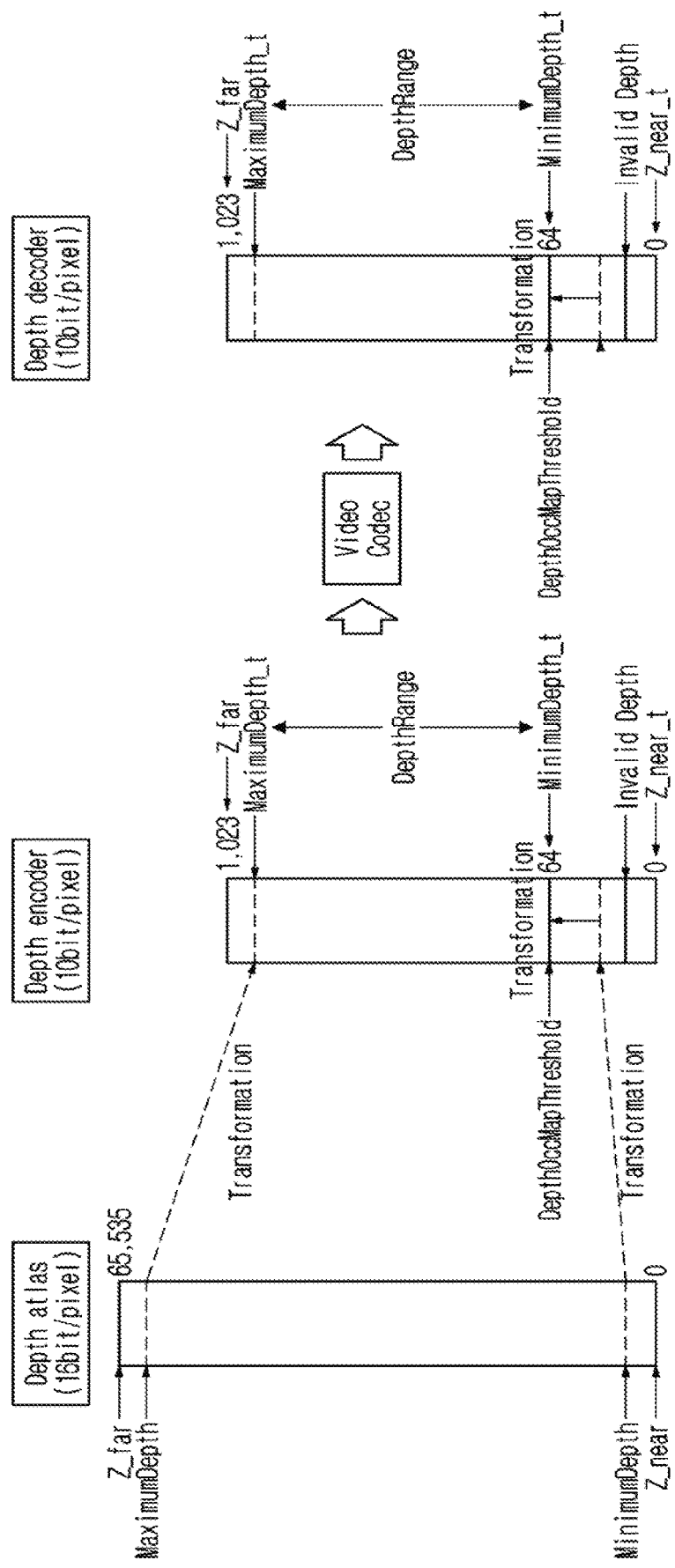
FIG. 5 illustrates an example where a valid pixel and an invalid pixel are distinguished based on a threshold.

FIG. 5 illustrates an example where a valid pixel and an invalid pixel are distinguished based on a threshold.

For the convenience of explanation, it is assumed that a depth atlas is 16 bits in depth but a depth encoder and a depth decoder support a 10-bit depth map.

A depth value is derived based on a distance between a camera and an object in a predetermined source video. For example, when a distance from a camera to a particular object is m, a depth value may be derived to be proportional to m (for example, depth_value=N*m) or to be inversely proportional to m (for example, depth_value=N/m).

For example, as shown in FIG. 5, the variable Z_x (x is near or far) may represent a distance from a camera to a particular object. For example, the variable Z_near represents a distance between a camera and a nearest object, and the variable Z_far represents a distance between a camera and a farthest object.

When a depth atlas is 16 bits in depth, pixels in the depth atlas have values between 0 and 65,535 (2^16−1). Herein, when a depth encoder supports a 10-bit depth map, depth values in the depth atlas may be converted to a range from 0 to 1,023.

Herein, a value of an invalid pixel may be set to a preset value (Invalid Depth of FIG. 5) less than a threshold.

However, when a threshold for detecting a valid pixel and an invalid pixel in a depth atlas is set to 64, valid pixels having converted values between 0 and 63 may be determined as invalid in an immersive video output apparatus. This is a problem.

In order to solve this problem, a value of a valid pixel having a converted value less than a threshold may be changed to be equal to the threshold or to be greater than the threshold. As a result, a range of a minimum depth value (Minimum_Depth of FIG. 5) and a maximum depth value (Maximum_Depth of FIG. 5) before conversion may be changed to be between a threshold (DepthOccMapThreshold of FIG. 5) and a maximum value (1023 of FIG. 5).

In a decoder, a distance between a camera and a particular object may be reconstructed based on a depth value. In order to reconstruct a distance to a particular object in a decoder, distance-related information used for normalizing a depth value may be encoded as metadata. In other words, information on the variable Z_near and information on the variable Z_far may be encoded. The variable Z_near represents a distance between a camera and a nearest object, and the variable Z_far represents a distance between the camera and a farthest object.

Alternatively, a distance between a camera and an object may be normalized, and a reciprocal of the normalized distance (for example, when the distance is m, 1/m) may be encoded. For example, by normalizing the Z_near, the variable Z_near_t may be derived, and a first syntax, to which (1/Z_near_t) is allocated, may be encoded.

In addition, by normalizing the variable Z_far, the variable Z_far_t may be derived, and a second syntax, to which (1/Z_far_t) is allocated, may be encoded. Herein, the value of Z_far may remain the same after normalization.

However, in the above case, a range of depth value capable of being expressed may be reduced. For example, when a threshold is not used to distinguish between a valid pixel and an invalid pixel, a depth value may be expressed within a range from 0 to 1,023. On the other hand, when a threshold is used to distinguish between a valid pixel and an invalid pixel, a depth value may be expressed within a range from 64 to 1,023. In addition, when a value of a valid pixel is forcibly converted, the quality of a reconstructed video may be degraded.

In order to solve the above problem, the present disclosure proposes to generate an occupancy map indicating whether a pixel having a value less than a threshold is a valid pixel or an invalid pixel, instead of converting a value of a valid pixel to be equal to or greater than the threshold. In other words, according to the present disclosure, even when occupancy information is embedded into a depth atlas, a separate occupancy map may be generated.

An occupancy map may be generated in each patch. In this case, information indicating whether or not an occupancy map associated with each patch is encoded may be encoded in the patch. For example, when the syntax occupancy_map_flag[v][p] has a value of 1, an occupancy map is encoded for a patch with index p in an atlas video with index v. In this case, when decoding the patch with index p, an immersive video output apparatus may determine whether a pixel having a smaller value than a threshold is a valid pixel or an invalid pixel by referring to the occupancy map. On the other hand, when the syntax occupancy_map_flag[v][p] has a value of 0, an occupancy map is not encoded for a patch with index p in an atlas video with index v. In this case, when decoding the patch with index p, an immersive video output apparatus may determine a pixel having a smaller value than a threshold as an invalid pixel.

As another example, an occupancy map may be generated for each patch group. Herein, a patch group may represent a tile or a set of patches to which a same index is allocated. In this case, information indicating whether or not an occupancy map associated with each patch group is encoded may be encoded in the patch group. For example, when the syntax occupancy_map_flag[v][t] has a value of 1, an occupancy map is encoded for a tile with index t in an atlas video with index v. In this case, when decoding patches belonging to a tile with index t, an immersive video output apparatus may determine whether a pixel having a smaller value than a threshold is a valid pixel or an invalid pixel by referring to the occupancy map. On the other hand, when the syntax occupancy_map_flag[v][t] has a value of 0, an occupancy map is not encoded for a tile with index t in an atlas video with index v. In this case, when decoding patches belonging to a tile with index t, an immersive video output apparatus may determine a pixel having a smaller than a threshold as an invalid pixel.

As another example, when an occupancy map is generated for each atlas video, information indicating whether or not decoding should be performed by referring to the occupancy map may be encoded in each patch or patch group. For example, when the syntax occupancy_map_flag[v][p] has a value of 1, an occupancy map should be referred to for decoding a patch with index p in an atlas video with index v. In this case, when decoding the patch with index p, an immersive video output apparatus may determine whether a pixel having a smaller value than a threshold is a valid pixel or an invalid pixel by referring to the occupancy map. On the other hand, when the syntax occupancy_map_flag[v][p] has a value of 0, it is not necessary to refer to an occupancy map for decoding a patch with index p in an atlas video with index v. In this case, when decoding the patch with index p, an immersive video output apparatus may determine a pixel having a smaller value than a threshold as an invalid pixel.

Figure 6:
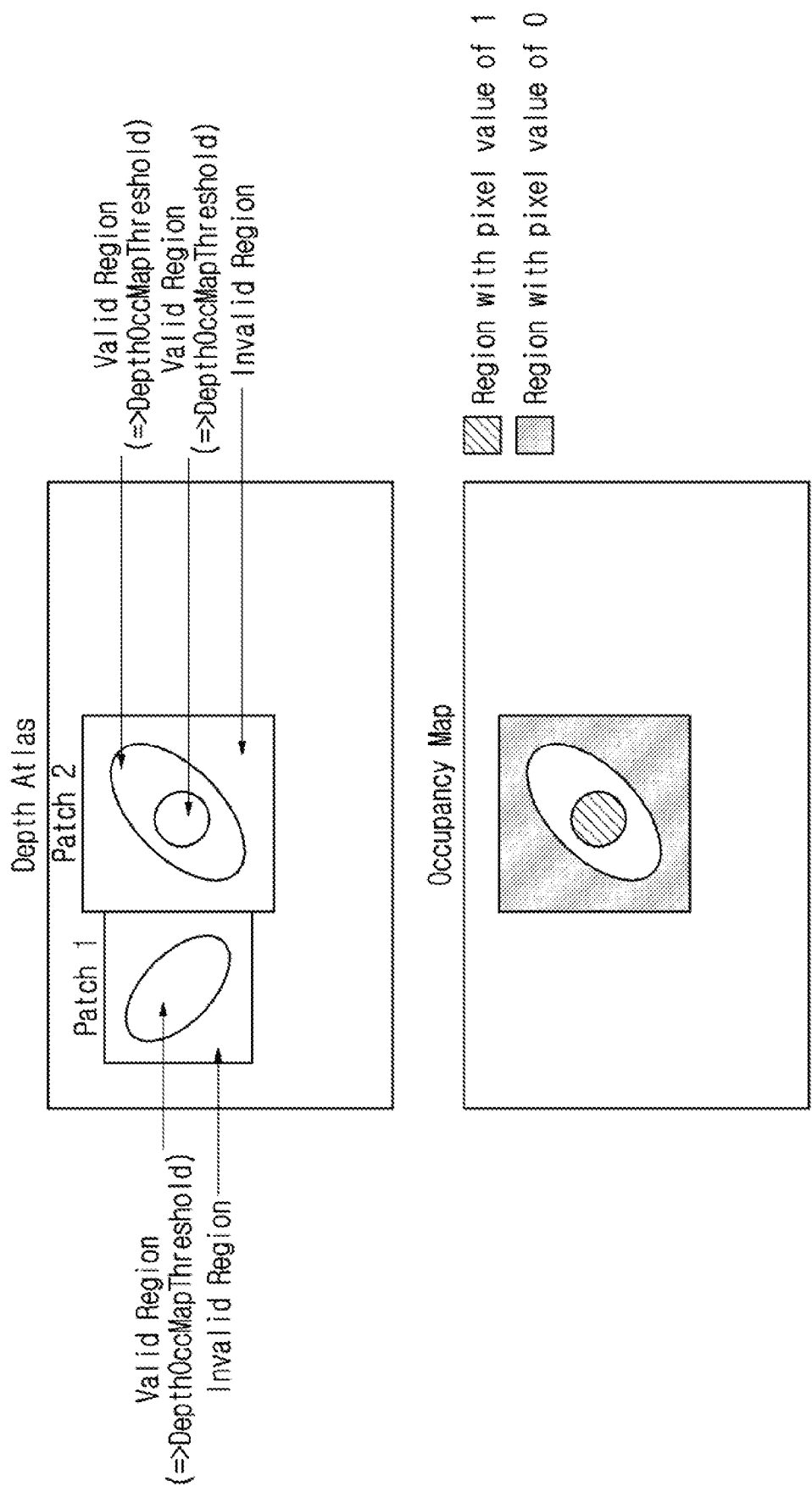
FIG. 6 is a view for explaining an example of generating an occupancy map.

FIG. 6 is a view for explaining an example of generating an occupancy map.

Two patches are illustrated in FIG. 6. In Patch 1, all the values of valid pixels within the valid region are equal to or greater than a threshold. Since all the values of valid pixels are equal to or greater than a threshold, it is not necessary to refer to an occupancy map for decoding Patch 1. Accordingly, no occupancy map may be set to be generated for Patch 1.

In Patch 2, some values of valid pixels within the valid region are less than a threshold. Since some of valid pixels have values less than a threshold, when decoding Patch 2, valid pixels and invalid pixels should be distinguished by referring to an occupancy map. Accordingly, it is necessary to generate a separate occupancy map for Patch 2.

An occupancy map may be binary type data indicating whether pixels having a smaller value than a threshold are valid pixels or invalid pixels. For example, when a pixel value in an occupancy map is 1, it may indicate that a pixel having a smaller value than a threshold is a valid pixel. On the other hand, when a pixel value in an occupancy map is 0, it may indicate that a pixel having a smaller value than a threshold is an invalid pixel.

For example, when an occupancy map for Patch 2 is generated, a value of a portion corresponding to an invalid region among regions having a pixel value smaller than a threshold may be set to 0, and a value of a portion corresponding to a valid region among regions having a pixel value smaller than the threshold may be set to 1.

When an occupancy map is generated, the occupancy map may be set to have the same size as a patch. Herein, even when a region where a pixel value within a patch is greater than a threshold does not refer to an occupancy map, the region may be determined as a valid pixel. Accordingly, a value of a portion corresponding to a region, in which a pixel value within an occupancy map is greater than a threshold, may be set to a predefined value (for example, 0 or 1).

According to the above-described embodiments, when occupancy information is not embedded into a depth atlas, an occupancy map including occupancy information for all the patches within an atlas video may be generated and encoded. On the other hand, when occupancy information is embedded into a depth atlas, an occupancy map including occupancy information for at least one patch within an atlas video may be generated and encoded. In other words, the present disclosure may provide not only a method of generating an occupancy map covering an entire atlas video but also a method of generating an occupancy map covering a part of an atlas video. When the above two methods are selectively used, the disadvantage of increasing the amount of data by generating an occupancy map and the disadvantage of decreasing an expression range of depth value by embedding occupancy information into a depth atlas may be redeemed.

In the example illustrated in FIG. 5, the value Invalid Depth allocated to an invalid pixel within an invalid region is set to be less than a threshold, and a pixel with a greater value than the threshold is determined as a valid pixel. However, when the value Invalid Depth allocated to an invalid pixel is set to a threshold, invalid pixels within a depth map have a relatively smaller value than valid pixels and thus a problem of sensitivity to encoding noise may occur.

In order to solve such a problem, a value allocated to an invalid pixel may be set to be greater than a threshold, and a pixel with a smaller value than the threshold may be determined as a valid pixel.

Figure 7:
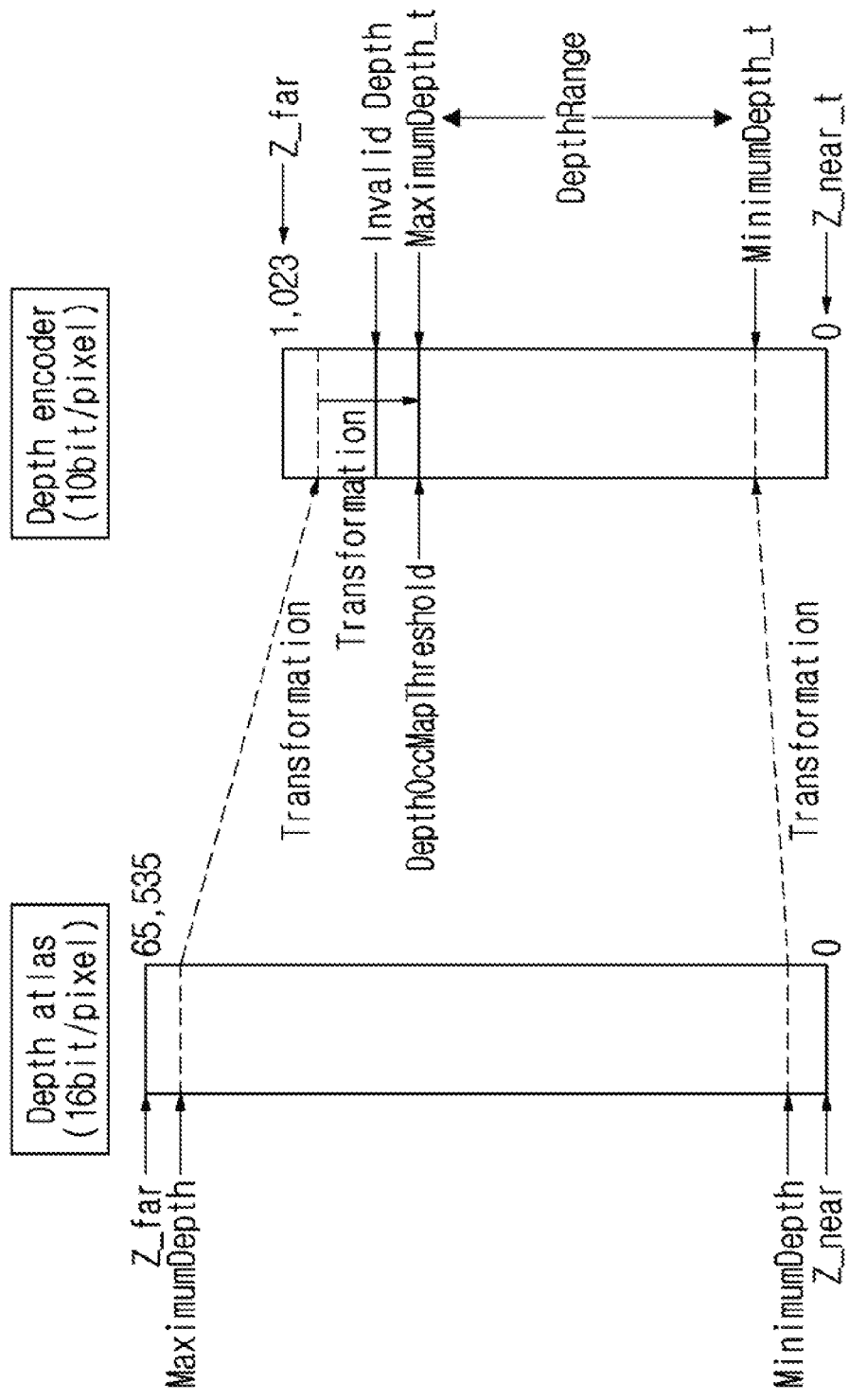
FIG. 7 illustrates an example where a value allocated to an invalid pixel is set as a greater value than a threshold.

FIG. 7 illustrates an example where a value allocated to an invalid pixel is set as a greater value than a threshold.

As in the example illustrated in FIG. 7, a value allocated to an invalid pixel (Invalid depth of FIG. 7) may be set to be greater than a threshold (DepthOccMapThreshold of FIG. 7). In this case, a pixel having a value equal to or less than a threshold may be set as a valid pixel. On the other hand, as for a pixel having a value greater than a threshold, whether the pixel is a valid pixel or an invalid pixel may be determined with reference to an occupancy map. In this case, a maximum depth value (Maximum depth of FIG. 7) may be set to be equal to or less than a threshold.

In the embodiments of FIG. 5 and FIG. 7, in order to distinguish between a valid pixel and an invalid pixel, at least one of information indicating a threshold, information indicating a minimum depth value and information on a maximum depth value may be transmitted as metadata.

For example, the syntax depth_start indicating a minimum depth value may be encoded and signaled. The syntax may be encoded in an atlas video unit or in a patch unit. For example, when minimum depth information is encoded in an atlas video unit, the syntax depth_start[v] may represent a minimum depth value within a depth atlas with index v. Alternatively, when minimum depth information is encoded in a patch unit, the syntax depth_start[v][p] may represent a minimum depth value of a patch with index p within a depth atlas with index v.

When encoding of the syntax depth_start is skipped, a minimum depth value may be considered to be 0 or equal to a threshold.

According to one embodiment of the present disclosure, the syntax depth_start may represent a minimum depth value of a depth atlas before transforming a depth value of the depth atlas to bits supported by a depth encoder.

In the embodiments illustrated in FIG. 5 and FIG. 7, the variable Minimum Depth may be determined by the syntax depth_start.

An immersive video processing apparatus may inverse transform a decoded depth value to bits per pixel, which are originally supported by a depth atlas, by using minimum depth information and normalized distance information. Accordingly, when projecting an immersive video space into 3D space, a depth value may be set more abundantly.

For example, the syntax depth_end indicating a maximum depth value may be encoded and signaled. The syntax may be encoded in an atlas video unit or in a patch unit. For example, when maximum depth information is encoded in an atlas video unit, the syntax depth_end[v] may represent a maximum depth value within a depth atlas with index v. Alternatively, when maximum depth information is encoded in a patch unit, the syntax depth_end[v][p] may represent a maximum depth value of a patch with index p within a depth atlas with index v.

When encoding of the syntax depth_end is skipped, a maximum depth value may be considered to be equal to a threshold or a maximum value capable of being represented by a bit depth.

According to one embodiment of the present disclosure, the syntax depth_end may represent a maximum depth value of a depth atlas before transforming a depth value of the depth atlas to bits supported by a depth encoder.

In the embodiments illustrated in FIG. 5 and FIG. 7, the variable Maximum Depth may be determined by the syntax depth_end.

An immersive video processing apparatus may inverse transform a decoded depth value to bits per pixel, which are originally supported by a depth atlas, by using maximum depth information and normalized distance information. Accordingly, when projecting an immersive video space into 3D space, a depth value may be set more abundantly.

When an occupancy map other than a depth atlas is additionally generated, the amount of data transmitted and received between an immersive video processing apparatus and an immersive video output apparatus may increase, which is problematic. Herein, the amount of data may represent an amount of data compared to an original video (hereinafter, a pixel rate) and bits in compression (hereinafter, a bit rate).

Figure 8:
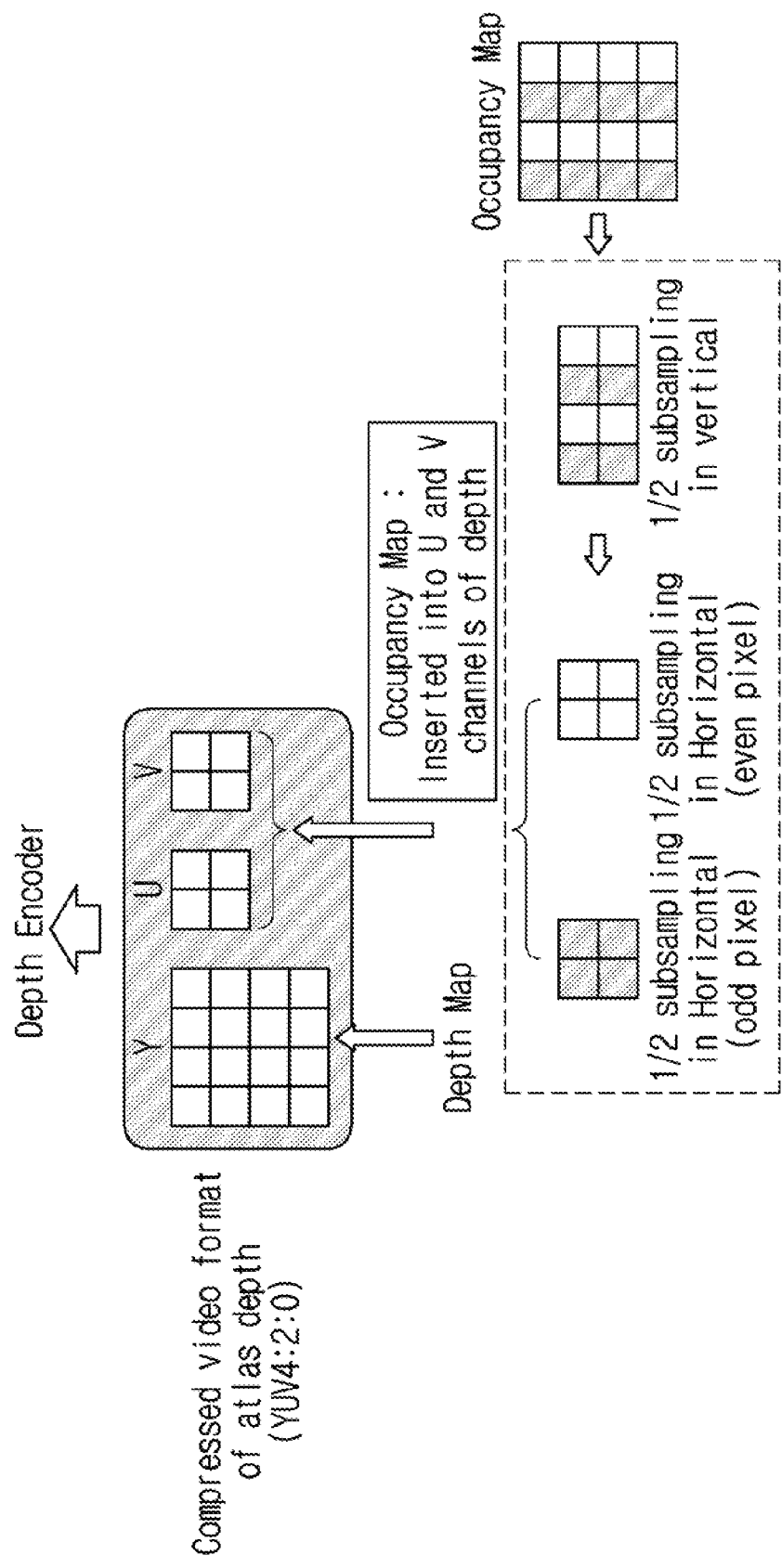
FIG. 8 illustrates a method of transmitting an occupancy map without increase of pixel rate.

FIG. 8 illustrates a method of transmitting an occupancy map without increase of pixel rate.

Like a general texture video, a video format for encoding a depth atlas may follow a YUV format (for example, YUV 4:2:0, 4:2:2, etc.). In this case, since the depth atlas includes only a Y value, when encoding the depth atlas, a depth value may be expressed through a Y channel but U and V channels may be empty.

By using the above feature of a depth atlas, an occupancy map may be transmitted by means of a U channel and/or a V channel. Accordingly, even when an additional transmission channel and a pixel rate do not increase, occupancy information for distinguishing between a valid pixel and an invalid pixel may be signaled.

Meanwhile, a size of Y channel may be different from a size of UV channel according to a YUV video format. For example, when a YUV 4:2:0 video format is used, a UV channel may have a ½ scaled-down shape in width and height, as compared to a Y channel. Thus, an occupancy map may be scaled down by ½ in width and height respectively, as compared to an original map. In addition, by separating even pixels and odd pixels within a downscaled occupancy map, either the even pixels or the odd pixels may be inserted into a U channel and the remaining pixels may be inserted into a V channel.

In an example illustrated in FIG. 8, both the U channel and the V channel are used to compress and transmit an occupancy map. Unlike the illustrated example, only a U channel or a V channel may be used to compress and transmit an occupancy map.

When only a U channel or a V channel is used, an occupancy map may be scaled down by ½ in width and height respectively as compared to the original, and only even pixels or odd pixels may be transmitted through subsampling.

A reduction ration of an occupancy map may be differently determined according to a YUV video format.

When an occupancy map is compressed and transmitted after being downscaled, an immersive video processing apparatus should enlarge the downscaled occupancy map and reconstruct the map to the original state. However, even when an invalid pixel is processed as a valid pixel, video reconstruction is possible. Accordingly, the encoding efficiency may be improved and the amount of data may be reduced by fitting a valid pixel region within a downscaled occupancy map as close to block units (for example, coding units) as possible.

The names of the syntax elements described in the above embodiments are temporarily given in order to describe the embodiments of the present disclosure. Different names from the ones suggested in the present disclosure may be given to syntax elements.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The above-described embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and be recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skill in the computer software technology field. Examples of the computer-readable recording medium include magnetic recording media such as hard disks, floppy disks and magnetic tapes; optical data storage media such as CD-ROMs and DVD-ROMs; magneto-optimum media like floptical disks; and hardware devices, such as read-only memory (ROM), random-access memory (RAM), flash memory, etc., which are particularly structured to store and implement program instructions. Examples of the program instructions include not only a mechanical language code formatted by a compiler but also a high-level language code that may be implemented by a computer using an interpreter. In order to implement processes according to the present disclosure, the hardware devices may be configured to be operable through one or more software modules or vice versa.

Although the present disclosure has been described in terms of specific items such as detailed elements as well as the limited embodiments and the drawings, they are only provided to help more general understanding of the invention, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the invention.

What is claimed is:

1. An immersive video synthesizing method, the method comprising:

receiving a bitstream comprising video data and metadata;

obtaining an atlas by decoding the video data; and extracting patches required for view synthesis from the atlas based on the metadata, wherein, based on a threshold value, whether a pixel in a patch is occupied by a valid pixel or an invalid pixel is determined, wherein the metadata comprises a threshold information flag which indicates whether threshold information is individually decoded for each of patches or not, wherein when the threshold information flag indicates that threshold information is not individually decoded for each of patches, a threshold value is determined based on first threshold information signaled for a view, and wherein when the flag indicates that threshold information is individually decoded for each of patches, the threshold value is determined based on second threshold information signaled for the patch.

2. The immersive video synthesizing method of claim 1, wherein the metadata further comprise minimum value information indicating a minimum depth value in the atlas and maximum value information indicating a maximum depth value in the atlas.

3. The immersive video synthesizing method of claim 1, wherein the metadata further comprise a occupancy embedded flag indicating whether or not occupancy information is embedded into the atlas video or not, and wherein the threshold information flag is decoded only when the occupancy embedded flag indicates that occupancy information is embedded into the atlas video.

4. The immersive video synthesizing method of claim 3, wherein when the occupancy embedded flag indicates that the occupancy information is not embedded into the atlas, whether the pixel is occupied by the valid pixel or the invalid pixel is determined based on an occupancy map.

5. The immersive video synthesizing method of claim 4, wherein the metadata further comprise a occupancy map size flag indicating whether the occupancy map is allowed to have a different size different from the atlas.

6. The immersive video synthesizing method of claim 1, wherein, in the atlas video, if the pixel has a value smaller than the threshold value, the pixel is determined to be occupied by the invalid pixel, and if the pixel has a value equal or greater than the threshold value, the pixel is determined as occupied by the valid pixel.

7. An immersive video processing method, the method comprising:
    determining a priority order of source pictures;
    extracting patches from the source pictures by performing pruning based on the priority order;
    generating an atlas based on the extracted patches; and
    encoding metadata,
    wherein, if a pixel in a patch is occupied by a valid pixel, a value of the pixel is equal to or greater than a threshold value, and if a pixel in the patch is occupied by an invalid pixel, a value of the pixel is less than the threshold value,
    wherein the metadata comprises a threshold information flag which indicates whether threshold information is individually encoded for each of patches or not is included in the metadata,
    wherein when the threshold information flag indicates that threshold information is not individually encoded for each of patches, the threshold value is reflected to first threshold information signaled for a view, and
    wherein when the threshold information flag indicates that threshold information is individually encoded for each of patches, the threshold value is reflected to second threshold information encoded for the patch.

8. The immersive video processing method of claim 7, wherein the metadata further comprise minimum value information indicating a minimum depth value in the atlas and maximum value information indicating a maximum depth value in the atlas.

9. The immersive video processing method of claim 7, wherein the threshold information flag is encoded only when occupancy information is not embedded into the atlas.

* * * * *